(12) United States Patent
Hanqvist

(10) Patent No.: US 8,446,269 B2
(45) Date of Patent: May 21, 2013

(54) OBJECT DETECTION SYSTEM

(75) Inventor: Mattias Hanqvist, Linköping (SE)

(73) Assignee: Autoliv Development AB, Vargarda (SE)

( * ) Notice: Subject to any disclaimer, the term of this patent is extended or adjusted under 35 U.S.C. 154(b) by 603 days.

(21) Appl. No.: 12/447,797

(22) PCT Filed: Nov. 7, 2007

(86) PCT No.: PCT/SE2007/050824
§ 371 (c)(1),
(2), (4) Date: Apr. 29, 2009

(87) PCT Pub. No.: WO2008/057042
PCT Pub. Date: May 15, 2008

(65) Prior Publication Data
US 2010/0052885 A1    Mar. 4, 2010

(30) Foreign Application Priority Data
Nov. 10, 2006 (GB) .................................. 0622466.1

(51) Int. Cl.
*B60Q 1/00* (2006.01)
(52) U.S. Cl.
USPC ........... 340/436; 340/901; 340/933; 340/937; 340/425.5
(58) Field of Classification Search
USPC ............. 340/901, 933, 937, 425, 5, 436, 435, 340/573.1
See application file for complete search history.

(56) References Cited

U.S. PATENT DOCUMENTS

| 4,198,653 | A | * | 4/1980 | Kamin | 348/155 |
|---|---|---|---|---|---|
| 5,877,688 | A | * | 3/1999 | Morinaka et al. | 340/584 |
| 5,995,206 | A | * | 11/1999 | Morinaka et al. | 356/4.01 |
| 6,411,328 | B1 | | 6/2002 | Franke et al. | |
| 6,727,807 | B2 | * | 4/2004 | Trajkovic et al. | 340/436 |
| 7,400,266 | B2 | * | 7/2008 | Haug | 340/903 |
| 7,786,898 | B2 | * | 8/2010 | Stein et al. | 340/937 |
| 2003/0007074 | A1 | * | 1/2003 | Nagaoka et al. | 348/148 |
| 2003/0058357 | A1 | * | 3/2003 | Aotsuka | 348/272 |
| 2003/0083790 | A1 | * | 5/2003 | Hattori et al. | 701/1 |

(Continued)

FOREIGN PATENT DOCUMENTS

| DE | 10359192 | 7/2005 |
|---|---|---|
| JP | 2003-302470 | 10/2003 |

OTHER PUBLICATIONS

International Search Report and Written Opinion of PCT/SE2007/050824.

*Primary Examiner* — Daryl Pope
(74) *Attorney, Agent, or Firm* — Brinks Hofer Gilson & Lione

(57) ABSTRACT

An object detection system for a vehicle comprising an infrared camera for gathering an image of at least a part of the surroundings of the vehicle; and a processor for applying an algorithm to at least a part of the image gathered by the camera, the algorithm identifying non-relevant hot or warm objects (5, 6, 7) detected by the camera and reducing the brightness and/or distinctiveness of the non-relevant objects (5, 6, 7) in the image; and a display for displaying the image to a driver of the vehicle, characterized in that the infrared camera forms an image in the far infrared; and the algorithm identifies non-relevant hot or warm objects (5, 6, 7) detected by the camera.

12 Claims, 2 Drawing Sheets

U.S. PATENT DOCUMENTS

| | | |
|---|---|---|
| 2003/0123752 A1 | 7/2003 | Ishii et al. |
| 2004/0119819 A1* | 6/2004 | Aggarwal et al. ............. 348/143 |
| 2004/0183906 A1 | 9/2004 | Nagaoka et al. |
| 2005/0111698 A1* | 5/2005 | Kawai ........................... 382/103 |
| 2005/0276447 A1 | 12/2005 | Taniguchi et al. |
| 2005/0285038 A1* | 12/2005 | Frangioni ..................... 250/330 |
| 2007/0001822 A1* | 1/2007 | Haug ........................ 340/384.1 |

* cited by examiner

OBJECT DETECTION SYSTEM

CROSS REFERENCE TO RELATED APPLICATION

This application claims priority to International Application No. PCT/SE2007/050824, filed Nov. 7, 2007, which is based on and claims priority to United Kingdom Patent Application No. 0622466.1, filed Nov. 10, 2006.

FIELD OF THE INVENTION

This invention relates to an object detection system, and in more particularly, a system for assisting a driver of a vehicle in identifying objects such as pedestrians, cyclists, and animals while driving.

BACKGROUND AND SUMMARY OF THE INVENTION

In low visibility conditions such as during bad weather or poor lighting, the driver of a vehicle may have difficulty in identifying important objects such as pedestrians, cyclists, and animals. Clearly, it is important to identify such objects at an early stage to minimize the prospects of a collision between the vehicle and the object.

It has previously been proposed to provide an infrared (IR) camera, with an in-vehicle display showing a representation of the image gathered by the camera. Since objects such as pedestrians, cyclists, and animals are generally warmer than their surroundings, such objects are often easier to identify on the image gathered by the (IR) camera.

In addition to this, it has been proposed to increase the brightness or visibility of warm objects detected by the IR camera, by applying a border or outline to the object in the image displayed to the driver, or by artificially increasing the brightness and/or contrast of these objects in the display.

It is an object of the present invention to provide an improved detection system of the type discussed above.

Accordingly, one aspect of the present invention provides an object detection system for a vehicle comprising an infrared camera for gathering an image of at least part of the surroundings of the vehicle; and a processor for applying an algorithm to at least a part of the image gathered by the camera, the algorithm identifying non-relevant hot or warm objects detected by the camera and reducing the brightness and/or distinctiveness of the non-relevant objects in the image. The present invention also includes a display for displaying the image to a driver of the vehicle, characterized in that the infrared camera forms an image from wavelengths of light falling in the range from around 5 µm to 20 µm, wherein the algorithm identifies non-relevant hot or warm objects detected by the camera.

Preferably, non-relevant objects include exhaust pipes, warm buildings and lamps.

Conveniently, objects whose shape changes at a rate below a predetermined threshold is categorized as a non-relevant object.

Advantageously, an object whose shape does not correspond to one of a set of predetermined templates is categorized as a non-relevant object.

Preferably, objects having a size outside a predetermined range are categorized as non-relevant objects.

Conveniently, objects having a temperature outside a predetermined range are categorized as being non-relevant.

Advantageously, the algorithm further identifies relevant hot or warm objects in the image.

Preferably, the brightness and/or distinctiveness of relevant objects in the image is increased.

Conveniently, relevant objects in the image are displayed with increased brightness, a different color, or have a border applied thereto.

Advantageously, the camera forms an image from wavelengths of light falling in the range from around 7.5 µm to 14 µm.

A further aspect of the present invention provides a method of enhancing images, comprising the steps of gathering an infrared view of at least a part of the surroundings of a vehicle, applying an algorithm to the gathered image to identify non-relevant objects in the image, reducing the brightness and/or distinctiveness of the non-relevant objects in the image, and displaying the image to a driver of the vehicle, characterized in that the view is formed from wavelengths of light falling in the range from around 5 µm to 20 µm, and the algorithm identifies non-relevant hot or warm objects in the image.

A further aspect of the present invention provides a computer program comprising computer program code adapted to perform all of the steps above when run on a computer including a processor for executing the computer program.

Another aspect of the present invention provides a computer program according to above, embodied on a computer readable medium.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
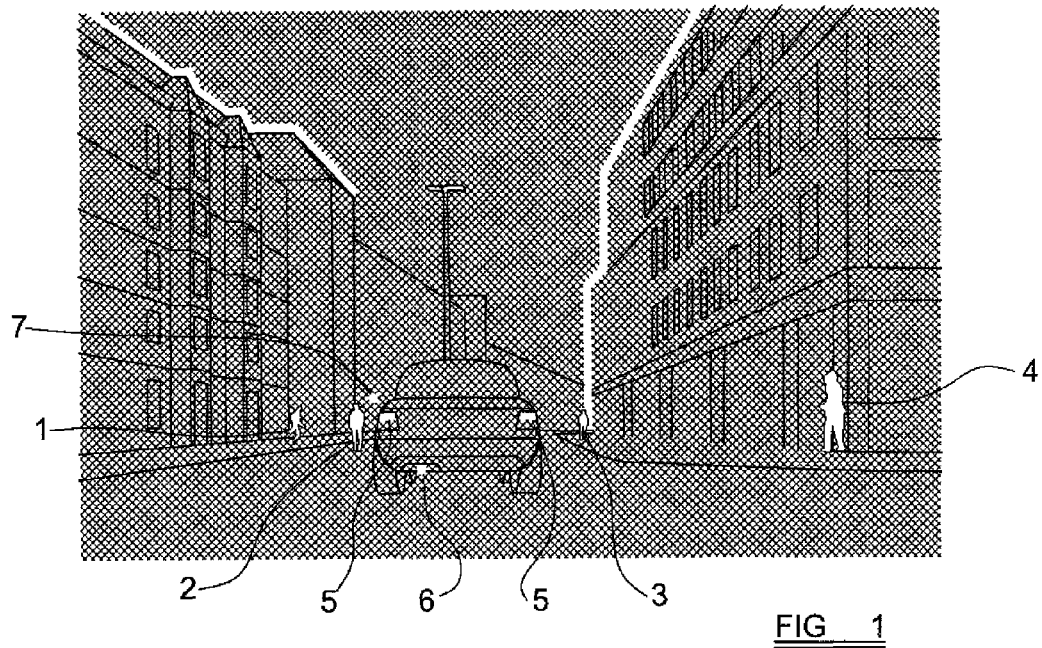
FIG. 1 is a schematic representation of an image observed by an infrared camera of an object detection system according to the present invention.

To better illustrate the present invention, embodiments thereof will now be described, by way of example, with reference to accompanying FIGS. 1 and 2, which show views displayed to a driver of a vehicle before and after application of an algorithm for use with the present invention, respectively.

A problem with conventional systems of the type described above is that non-relevant objects which are above the ambient temperature, such as exhaust pipes, headlights and engines of other vehicles, warm buildings, and lamp-posts, may often be identified by the system. In such cases, these non-relevant objects will also be accentuated by applying a border to, or increasing the brightness of, the objects.

In embodiments of the present invention, an algorithm is applied to an image gathered by an IR camera, to identify non-relevant objects which appear in the image gathered by the camera. The brightness or distinctiveness of these non-relevant objects is then reduced, and in preferred embodiments this is achieved by reducing the brightness of pixels comprising non-relevant objects, to reduce the contrast of these pixels compared to the surrounding pixels.

Techniques for identifying non-relevant warm or hot objects will now be discussed.

A characteristic of relevant objects, which in general comprise humans and animals, and are more specifically expected to be pedestrians, cyclists, and animals, is that the shape of the object will usually not remain constant over time. As a pedestrian, cyclist, or animal moves, the legs of the person or animal in question will appear to move in the image, whereas the shape of non-relevant objects, which generally comprise fixed or inanimate objects, or parts of vehicles, and are more specifically expected to be buildings, exhaust pipes, and street lights, will remain significantly more constant over time. Therefore, a hot or warm object whose shape changes at a rate exceeding a predetermined threshold may be classified as a relevant object, with other objects being classified as non-relevant.

Patterns of movement and speed of movement may also be used in distinguishing between various objects.

It is, however, appreciated that a pedestrian, cyclist, or animal may stop moving temporarily and yet still present a hazard, and that algorithms according to these embodiments may fail to alert a driver to a relevant object in such circumstances.

Another way in which relevant and non-relevant hot or warm objects may be distinguished is by the temperature profile of the object. Humans and animals will tend to have a body temperature that is constant and relatively narrowly-defined, and any hot or warm object with a temperature not falling within this narrow range may be categorized as being non-relevant. Typically, the temperature range will be around the external temperature of a person, taking into account the fact that, in general, both regions of the person's skin will be exposed, and also regions of the person's clothing, which will have been heated by the person's body, will be included in the image, and these latter regions will be at a temperature which is significantly lower than the temperature of the person's skin.

In many instances, an infrared camera will not give a reading which indicates absolute temperature, but rather will be able to detect variations in temperature. Since the temperature difference between a person and his or her surroundings is likely to be relatively uniform, preferred embodiments of the invention analyze differences in temperature rather than absolute temperatures, to make a determination as to whether an object is relevant or non-relevant. It is expected that such determinations will be made based on statistical techniques, as will be understood by a skilled person.

The distribution of temperature about an object may also provide an indication as to whether the object is relevant or non-relevant. For instance, a shape in an infrared image representing a human will generally have a warm portion at the top of the shape, as the head of a human is relatively warm compared to the rest of the body, and a human's head is also usually uncovered, whereas the remainder of the body is likely to be clothed. Therefore, an object of approximately human shape, having a top portion (in general around the top $\frac{1}{6}^{th}$ to $\frac{1}{8}^{th}$ of the shape) which is hotter than the remainder of the shape, may be classified as a relevant object, with other hot or warm objects being classified as non-relevant.

A further technique that may be used is to examine the shapes of hot or warm objects. In general, relevant objects such as pedestrians, cyclists, and animals will appear as irregular shapes in an image gathered by an infrared camera, whereas objects such as exhaust pipes, street lights, and warm buildings will appear as significantly more regular shapes.

A further possibility is that the shape of a detected hot or warm object may be compared with a set of templates, whose shapes correspond to those of pedestrians, cyclists, and animals seen from various angles. If a detected object has a shape approximating to one of these templates, then the object may be classified as relevant. Otherwise, the object will be classified as non-relevant.

The size of the objects in question may also be taken into account. Pedestrians, cyclists, and animals are generally significantly larger than small non-relevant objects such as street lamps, headlights, and exhaust pipes, and significantly smaller than warm buildings. If an approximate determination as to the size of an object can be made, for instance based on a detected distance to the object, then only objects falling within a certain range of sizes may be classified as being relevant. For instance, an object having a size between 0.5 m and 2.5 m in any direction may be classified as being relevant, with other objects being classified as non-relevant.

In addition to decreasing the brightness/distinctiveness of non-relevant hot or warm objects, the brightness and/or distinctiveness of objects that have been classified as relevant may be increased as part of the algorithm. As discussed above, this may be achieved by artificially increasing the contrast between pixels comprising these objects and surrounding pixels in the image presented to the driver, or by applying an outline around the objects in the image.

Returning to the figures, FIG. 1 shows an image gathered by an on-vehicle infrared L (IR) camera before application of an algorithm according to the present invention. Four pedestrians 1, 2, 3, 4 appear in the image, but are relatively indistinct. By contrast, the tail lights 5 and exhaust pipe 6 of a nearby vehicle are relatively distinct, as is a street light 7.

Figure 2:
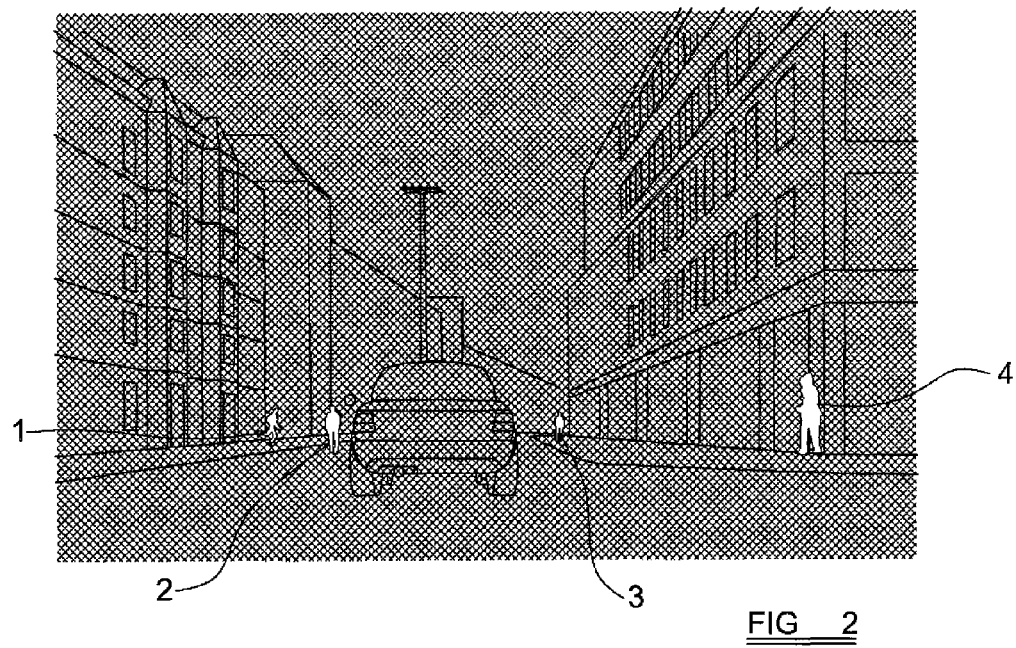
FIG. 2 is a schematic representation of the image of FIG. 1 after an algorithm has been applied to the image.

Turning to FIG. 2, the same image is shown after application of an algorithm according to the present invention. The four pedestrians 1, 2, 3, 4 are much more distinct, and the tail lights 5, exhaust pipe 6, and street light 7, are much less prominent. Indeed, a viewer's attention is immediately drawn to the four pedestrians 1, 2, 3, 4 in this image.

The IR camera is a far infrared camera. Far infrared is preferably defined as being the region of the electromagnetic spectrum with wavelength falling between around 5 μm to 20 μm, and more preferably falling between around 7.5 μm to 14 μm. In preferred embodiments, the image is formed principally or only from these wavelengths.

Figure 3:
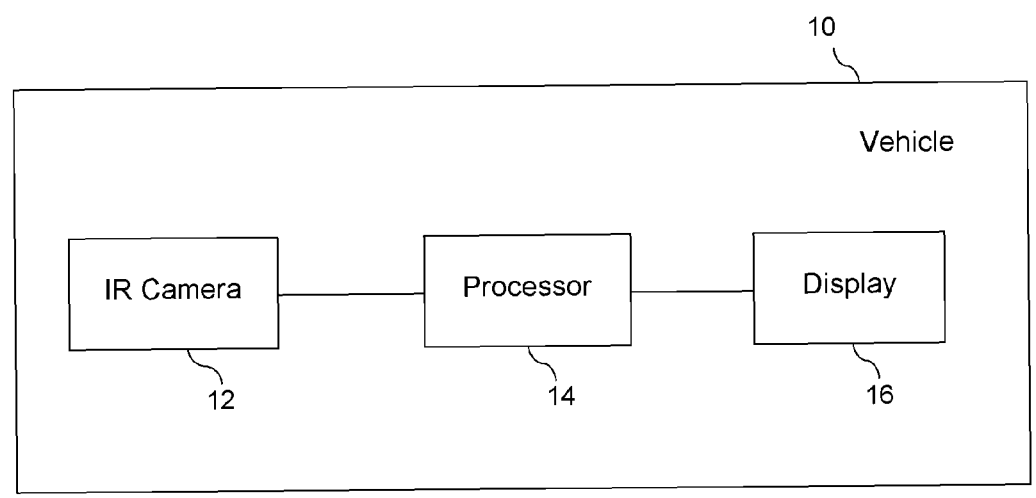
FIG. 3 is a block diagram of an object detection system.

FIG. 3 is a block diagram of an object detection system. As described elsewhere herein, the system may be implemented on a vehicle 10 and include an IR camera 12, a processor 14, and a display 16.

It will be appreciated that embodiments of the present invention provide a system which allows a driver of a vehicle to identify readily relevant hot or warm objects in conditions of poor visibility, while reducing the likelihood of the driver being distracted by non-relevant objects.

In an alternative embodiment, dedicated hardware implementations, such as application specific integrated circuits, programmable logic arrays and other hardware devices, can be constructed to implement one or more of the methods described herein. Moreover, the methods described herein may be implemented by software programs executable by a computer system. Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. In a vehicle having an object detection system for assisting a driver of the vehicle, the object detection system including an infrared camera operatively connected to a processor, the improvement comprising:
    the infrared camera for gathering an image of at least a partial surrounding of the vehicle;
    the processor for applying an algorithm to at least a part of the image gathered by the camera, the algorithm identifying non-relevant hot or warm objects detected by the infrared camera and reducing at least one of a brightness and distinctiveness of the non-relevant objects in the image; and
    a display for displaying the image to the driver of the vehicle,
    wherein the infrared camera forms the image from wavelengths of light ranging generally from 5 µm to 20 µm.

2. A system according to claim 1, wherein non-relevant objects include at least one of exhaust pipes, warm buildings, and lamps.

3. In a vehicle having an object detection system for assisting a driver of the vehicle, the object detection system including an infrared camera operatively connected to a processor, the improvement comprising:
    the infrared camera for gathering an image of at least a partial surrounding of the vehicle;
    the processor for applying an algorithm to at least a part of the image gathered by the camera, the algorithm identifying non-relevant hot or warm objects detected by the infrared camera and reducing at least one of a brightness and distinctiveness of the non-relevant objects in the image; and
    a display for displaying the image to the driver of the vehicle,
    wherein the infrared camera forms the image from wavelengths of light ranging generally from 5 µm to 20 µm,
    wherein the non-relevant objects include objects having a shape which changes at a rate below a predetermined threshold.

4. A system according claim 1, wherein the non-relevant objects include objects having a shape which does not correspond to one of a set of predetermined templates.

5. A system according to claim 1, wherein the non-relevant objects include objects having a size outside a predetermined range.

6. A system according to claim 1, wherein the non-relevant objects include objects having a temperature outside a predetermined range.

7. A system according to claim 1, wherein the algorithm further identifies relevant hot or warm objects in the image.

8. A system according to claim 7, wherein at least one of a brightness and distinctiveness of the relevant objects in the image is increased.

9. A system according to claim 8, wherein the relevant objects in the image are displayed with at least one of an increased brightness, a different colour, or having a border applied thereto.

10. A system according to claim 1, wherein the camera forms an image from wavelengths of light ranging generally from 7.5 µm to 14 µm.

11. A method of enhancing images, comprising the steps of:
    gathering an infrared view of at least a partial surrounding of a vehicle;
    applying an algorithm to the gathered image to identify non-relevant hot or warm objects in the image,
    reducing at least one of a brightness and distinctiveness of the non-relevant objects in the image; and
    displaying the image to a driver of the vehicle, wherein the view is formed from wavelengths of light ranging generally from 5 µm to 20 µm.

12. The method according to claim 11, wherein the non-relevant objects include objects having a shape which changes at a rate below a predetermined threshold.

* * * * *